United States Patent
Kretschmann et al.

(10) Patent No.: US 12,296,886 B2
(45) Date of Patent: May 13, 2025

(54) METHOD FOR OPERATING A MOTOR VEHICLE, AND MOTOR VEHICLE

(71) Applicant: AUDI AG, Ingolstadt (DE)

(72) Inventors: Philipp Kretschmann, Manching (DE); Johannes Reschke, Langquaid (DE); Markus Birkner, Regensburg (DE); Georg Maier, Kinding-Haunstetten (DE)

(73) Assignee: AUDI AG, Ingolstadt (DE)

( * ) Notice: Subject to any disclaimer, the term of this patent is extended or adjusted under 35 U.S.C. 154(b) by 152 days.

(21) Appl. No.: 17/997,449

(22) PCT Filed: Apr. 12, 2021

(86) PCT No.: PCT/EP2021/059367
§ 371 (c)(1),
(2) Date: Oct. 28, 2022

(87) PCT Pub. No.: WO2021/219350
PCT Pub. Date: Nov. 4, 2021

(65) Prior Publication Data
US 2023/0264627 A1    Aug. 24, 2023

(30) Foreign Application Priority Data

Apr. 28, 2020  (DE) .................. 10 2020 111 476.1

(51) Int. Cl.
*B62D 15/02* (2006.01)
*B60Q 1/50* (2006.01)
*B60W 30/06* (2006.01)

(52) U.S. Cl.
CPC ......... *B62D 15/0285* (2013.01); *B60Q 1/507* (2022.05); *B60Q 1/543* (2022.05); *B60W 30/06* (2013.01); *B60W 2556/45* (2020.02)

(58) Field of Classification Search
CPC .... B62D 15/0285; B60Q 1/507; B60Q 1/543; B60Q 1/48; B60W 30/06; B60W 2556/45
See application file for complete search history.

(56) References Cited

U.S. PATENT DOCUMENTS

| | | |
|---|---|---|
| 10,407,008 B2 | 9/2019 | Bonnet et al. |
| 2013/0268144 A1 | 10/2013 | Du et al. |

(Continued)

FOREIGN PATENT DOCUMENTS

| | | |
|---|---|---|
| CN | 103359052 A | 10/2013 |
| CN | 105398431 A | 3/2016 |

(Continued)

OTHER PUBLICATIONS

International Search Report of the International Searching Authority directed to related International Patent Application No. PCT/EP2021/059367, mailed Jul. 9, 2021, with attached English-language translation; 6 pages.

(Continued)

*Primary Examiner* — Daryl C Pope
(74) *Attorney, Agent, or Firm* — Sterne, Kessler, Goldstein & Fox P.L.L.C.

(57) ABSTRACT

A method for operating a motor vehicle, wherein the motor vehicle is configured to execute a driving maneuver that can be executed without a driver, wherein, before the driving maneuver is executed by a computing device of the motor vehicle, a check is made to determine that at least one admissibility requirement for the execution of the driving maneuver is met. The execution of an operator action required to start the execution of the driving maneuver, executed by a user of the motor vehicle positioned outside the motor vehicle, is detected, or the absence thereof up to the present time is detected. The execution of the operator action can be detected by a monitoring device connected to the computing device, and/or based on a transmission of data (Continued)

Figure 1:
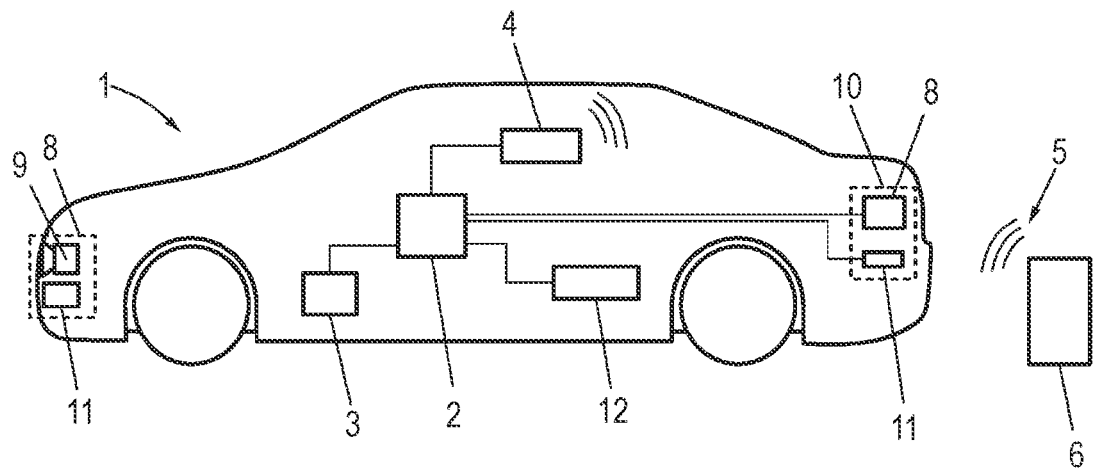

describing the execution of the operator action to a communication device of the motor vehicle connected to the computing device. Depending on whether the at least one admissibility requirement is met and depending on whether or not the at least one operator action is executed, the computing device determines a state from a group of possible states. A signaling device of the motor vehicle is actuated to generate a signal assigned to the determined state from a group of distinguishable signals that can be perceived outside the motor vehicle and that are each assigned to one of the possible states.

15 Claims, 1 Drawing Sheet

(56) References Cited

U.S. PATENT DOCUMENTS

| | | | |
|---|---|---|---|
| 2016/0068158 | A1 | 3/2016 | Elwart et al. |
| 2017/0301241 | A1 | 10/2017 | Urhahne et al. |
| 2018/0039264 | A1 | 2/2018 | Messner et al. |
| 2018/0050689 | A1 | 2/2018 | Unveren et al. |
| 2019/0202443 | A1 | 7/2019 | Lavoie et al. |
| 2020/0310407 | A1* | 10/2020 | Van Wiemeersch ......................... B62D 15/0285 |
| 2021/0027626 | A1 | 1/2021 | Badouin et al. |
| 2022/0355791 | A1 | 11/2022 | Hao et al. |

FOREIGN PATENT DOCUMENTS

| | | |
|---|---|---|
| CN | 107284445 A | 10/2017 |
| CN | 107757610 A | 3/2018 |
| CN | 109991959 A | 7/2019 |
| CN | 110654397 A | 1/2020 |
| CN | 110901631 A | 3/2020 |
| DE | 102013104859 A1 | 11/2014 |
| DE | 102013213754 A1 | 1/2015 |
| DE | 102014205122 A1 | 9/2015 |
| DE | 102014018189 A1 | 6/2016 |
| DE | 102015208124 A1 | 10/2016 |
| DE | 102016202976 A1 | 9/2017 |
| DE | 102017200670 B3 | 6/2018 |
| DE | 102017217784 A1 | 4/2019 |
| DE | 102018203685 A1 | 9/2019 |
| JP | 2018065488 A | 4/2018 |

OTHER PUBLICATIONS

"Audi Q7 (2018-2021) Automated Parking," published on YouTube dated Apr. 16, 2018, available at: https://www.youtube.com/watch?v=NzqUNYU-7_8, accessed Sep. 13, 2022; 6 pages.

International Preliminary Report on Patentability directed to related International Patent Application No. PCT/EP2021/059367, issued Oct. 27, 2022, with attached English-language translation; 14 pages.

* cited by examiner ized to have reduced complexity compared to a display device to provide such information. The at least one signaling device can be a signaling device that is already present in the motor vehicle, so that the signaling of the state of the motor vehicle can be implemented particularly cost-effectively.

METHOD FOR OPERATING A MOTOR VEHICLE, AND MOTOR VEHICLE

TECHNICAL FIELD

The present disclosure relates to a method for operating a motor vehicle, the motor vehicle being configured to execute at least one driving maneuver that can be executed without a driver. The present disclosure also relates to a motor vehicle.

BACKGROUND

Various functions of motor vehicles are known in which the motor vehicle can execute one or more driving maneuvers without a driver. This can involve, for example, parking maneuvers in which the vehicle independently parks in a free parking space or a free parking spot. The degree of automation of the driving maneuver can be so high that it is not necessary for the driver to be in the motor vehicle, since the driving maneuver can be executed by the motor vehicle independently and possibly also without the driver monitoring (SAE Level 4). In this regard, various methods are known from the prior art.

DE 10 2013 104 859 A1 describes a system for parking a motor vehicle in a parking space, wherein the search for a possible parking space is made by activating an electronic unit arranged inside the motor vehicle. The motor vehicle can then be activated by a user via a communication field arranged on the outside of the motor vehicle, such that the motor vehicle is parked without a driver.

DE 10 2016 202 976 A1 describes a device for automated parking of a motor vehicle which has an environment sensor system and a control unit for executing an automated parking process. The automated parking process is triggered via an operating unit which is configured as a sensor system of a keyless entry system of the motor vehicle.

JP 2018065488 A describes a motor vehicle that can execute an automated parking process. The automated parking process is started by locking the motor vehicle, wherein the time remaining until the parking process is executed after the motor vehicle has been locked is displayed by means of a time interval represented by a flashing display device arranged inside or outside the motor vehicle.

In such automated driving processes, which can be executed in particular without the presence of a driver in the motor vehicle, it is desirable for the driver or user of the motor vehicle located outside the motor vehicle to be able to operate it as intuitively as possible. This presupposes that the driver or user can capture as simply as possible, outside of the motor vehicle, the information required for operation.

BRIEF DESCRIPTION OF DRAWINGS/FIGURES

Figure 2:
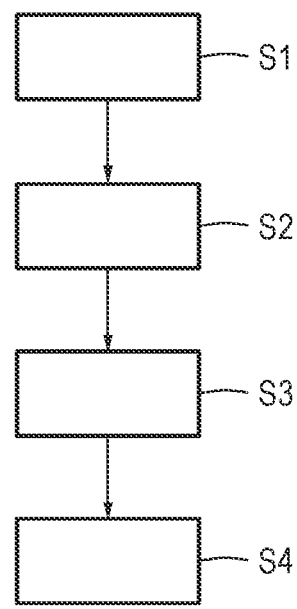

FIG. 1 shows an embodiment of a motor vehicle according to the present disclosure, and
FIG. 2 is a sketch for explaining an embodiment of the method according to the present disclosure.

DETAILED DESCRIPTION

The present disclosure is based on the object of specifying a method for operating a motor vehicle configured to execute at least one driving maneuver that can be executed without a driver, which method allows improved operability of the motor vehicle, in particular more comprehensible and/or more intuitive operability.

In order to achieve this object, it is provided according to the present disclosure, in a motor vehicle of the type mentioned at the outset, that, before the driving maneuver is executed by a computing device of the motor vehicle, a check is made to determine that at least one admissibility requirement for the execution of the driving maneuver is met. Furthermore, the execution of at least one operator action required to start the execution of the driving maneuver, executed by a user of the motor vehicle located outside the motor vehicle, is detected, or the absence thereof up to the present time is detected. The execution of the operator action can be detected by a monitoring device connected to the computing device, and/or based on a transmission of data describing the execution of the operator action to a communication device of the motor vehicle that is connected to the computing device. Depending on whether the at least one admissibility requirement is met, and depending on whether or not the at least one operator action is executed, the computing device 2 determines a state from a group of possible states. At least one signaling device of the motor vehicle is actuated to generate a signal assigned to the determined state, from a group of distinguishable signals that can be perceived outside the motor vehicle and that are each assigned to one of the possible states.

The method according to the present disclosure advantageously enables the user of the motor vehicle, outside the motor vehicle, to be able to recognize the state in which the motor vehicle is currently situated before the driverless driving maneuver is executed, on the basis of the signal assigned to the state. This advantageously makes it possible to use the signal to indicate to the user whether the at least one admissibility requirement for the execution of the driving maneuver has been met, and/or whether one or more admissibility requirements are not met, or not yet met. Furthermore, the user can be shown whether the at least one operator action required to start the execution of the driving maneuver has already been executed, or whether the execution of the operator action to start the execution of the driving maneuver is still awaited.

The driving maneuver can in particular be a driving maneuver that can be executed without intervention by the driver or the user. In particular, the motor vehicle can also be configured in such a way that it can execute the driving maneuver without the driver or the user remaining ready to intervene. The motor vehicle can, for example, include an environment sensor system which is connected to the computing device, the computing device being configured to execute the driving maneuver. The driving maneuver can be a parking maneuver, for example.

The execution of the operator action by the user can be detected by a monitoring device connected to the computing device, and/or based on a transmission of information describing the execution of the operator action by the user to a communication device of the motor vehicle connected to the computing device. The execution of the operator action can then be transmitted from the monitoring unit or the communication device to the computing device. Accordingly, the absence of the operator action can be detected by the fact that the monitoring device connected to the computing device has not yet detected the execution of the operator action and/or that no information describing the execution of the operator action has been transmitted to the communication device connected to the computing device, and/or that no execution of the operator action has been transmitted from the monitoring device and/or the communication device to the computing device. The operator action required to start the execution of the driving maneuver can be an activation trigger for the execution of the driverless driving maneuver.

The computing device of the motor vehicle makes it possible to generate, according to the current state, a signal via an actuation of a signaling device of the motor vehicle by the computing device, said signal being assigned to the current state from among a group of a plurality of possible states, wherein the current state results from one or more admissibility requirements either being met or not being met, and/or from the execution and/or the absence of one or more operator actions by the user. The signal generated by the signaling device of the motor vehicle can be perceived outside the motor vehicle, such that the user outside the motor vehicle can use the signal to obtain information about the current state of the motor vehicle. Different possible states are assigned different signals from a group of a plurality of different signals, such that the user can intuitively recognize each current state of the motor vehicle. This enables the user of the motor vehicle who is outside the motor vehicle to intuitively determine whether, for example, the at least one operator action is still required to start the execution of the driving maneuver, or whether, for example, there is an error condition in which the driving maneuver cannot be executed, or whether all necessary steps to start the execution of the driving maneuver have been executed.

Advantageously, a plurality of different states can be distinguished. On the one hand, a state in which, for example, the at least one admissibility requirement is met but the user has not yet executed the operator action required to start the execution of the driving maneuver can be identified by a signal assigned only to this state. Due to the identification of this state, the driver can consequently recognize that the execution of the operator action is still required to start the driving maneuver, but that at least one admissibility requirement for the execution of the driving maneuver has been met.

A further possible state can exist if, for example, at least one admissibility requirement for the execution of the driving maneuver is not met, wherein the user can recognize, by identifying this state through the signal assigned to the state, that the execution of the at least one operator action to start the execution of the driving maneuver in this state will not lead to a start of the execution of the driving maneuver. It is possible that a distinction is made between different admissibility requirements being met, such that different admissibility requirements that have not been met result in a different state and/or that the fact that at least one of a plurality of admissibility requirements has not been met is combined into one state.

Another possible state that can be differentiated can exist if the at least one admissibility requirement has been met and the operator action to start the execution of the driving maneuver has been executed by the user and also transmitted to the computing device as having been executed. In this way, the user can that all of the operator actions required prior to the execution of the driving maneuver have been executed successfully, and that there are no unmet admissibility requirements. This makes it possible for the user to recognize that the motor vehicle will now begin to execute the driving maneuver, such that the user can assume that the driving maneuver has started and can simply leave the motor vehicle without having to wait for the driving maneuver to be executed, for example, in a situation in which the start of the driving maneuver being executed will occur with a delay after the operator action is executed.

The user can thus recognize, outside of the motor vehicle, via the distinguishable signals assigned to the respective current states, which state the motor vehicle is currently in, and/or whether and, optionally if he can control the motor vehicle by executing the at least one operator action. This advantageously allows for intuitive and simplified operation of the motor vehicle for the execution of the driving maneuver that can be executed without a driver.

In a preferred embodiment of the present disclosure, it can be provided that at least one vehicle light, in particular a headlight and/or at least one signal light, in particular a turn signal light, a daytime running light and/or a brake light, can be used as the signaling device. In particular, it is possible for a combination of multiple headlights and/or multiple signal lights to be used, such that the signal generated via the signaling device can be perceived by the user from any position in the surroundings of the motor vehicle.

The use of at least one vehicle light arranged on the outside of the motor vehicle as a signaling device has the advantage that it must, at least to some degree, be a component of a motor vehicle anyway, and thus there is advantageously no need for an additional signaling device which must be provided. Furthermore, a group of different visual signals can be generated with at least one headlight or at least one signal light, which can be easily perceived and easily distinguished by the user of the motor vehicle.

According to the present disclosure it can be provided that at least some of the signals of the group of signals each comprise a different color and/or a different flashing frequency and/or a different operating pattern of the at least one vehicle light. Various states of the motor vehicle can be assigned different visual signals which can differ at least in part by a light color generated by means of the at least one vehicle light. In addition or as an alternative to this, a different flashing frequency of the at least one vehicle light and/or a different operating pattern of the at least one vehicle light are also possible.

An operating pattern can, for example, constitute an actuation of the at least one vehicle light which differs from a switched on and a switched off state, and which differs from a direct change between the switched on and the switched off state that is, flashing. An operating pattern can include, for example, a pulsing of the vehicle light, i.e., a continuous change in the brightness of the generated signal. Different operating patterns can differ, for example, in a frequency of the pulsing, such that these signals can be recognized and differentiated by the user due to their faster or slower pulsing.

According to the present disclosure, it can be provided that a signaling device configured for acoustic signaling is used, wherein at least some of the signals of the group of signals each comprise a different pitch, a different sound, and/or a different time sequence of tones and/or sounds. This makes it possible for the signals assigned to the different states to be at least partially distinguishable from one another acoustically. In particular, it is possible for one or more of the signals to include both a visual signal component and an acoustic signal component. The signaling device configured for acoustic signaling generates the acoustic signals or signal components in particular in such a way that they can be perceived by the user in the surroundings of the motor vehicle.

According to the present disclosure, it can be provided that the user's operator action is an operator action to be executed on the motor vehicle and/or in the surroundings of the motor vehicle and/or on a device connected to the communication device of the motor vehicle via a communication link. The execution of the user's operator action on the motor vehicle can be detected by the monitoring device connected to the computing device. It is also possible for the execution of the operator action on the motor vehicle to be detected by a further control unit of the motor vehicle, wherein information describing the execution of the operator action is transmitted to the communication device connected to the computing device, the communication device informing the computing device that the operator action has been executed. Additionally or alternatively, it is possible for the operator action to be executed on the device connected to the communication device of the motor vehicle via a communication link, with the result that the user of the motor vehicle does not have to be in direct contact with the motor vehicle to execute the operator action. The device can be a mobile device, in particular a smartphone with a corresponding app, or a vehicle key.

According to the present disclosure, it can be provided that the operator action is or includes the activation of a vehicle locking system on a vehicle key or a mobile device and/or that the operator action is or includes the user moving away from the surroundings of the motor vehicle. This advantageously makes it possible to use an already known operator action to start the execution of the driving maneuver. The vehicle can be locked using the vehicle key, for example directly on the motor vehicle by inserting the vehicle key into a lock cylinder of the motor vehicle, or wirelessly by activating a button on the vehicle key, for example, via a communication link to the communication device of the motor vehicle. It is also possible to activate a vehicle locking system by the user moving away from the surroundings of the motor vehicle, it being possible to detect the user moving away from the surroundings of the motor vehicle, for example, by the monitoring device of the motor vehicle.

In a preferred embodiment of the present disclosure, it can be provided that, if the operator action fails to take place beyond at least one time limit stored in the computing device, the signal assigned to the current state is changed in a distinguishable manner. This makes it possible to distinguish different situations in which, for example, the at least one admissibility requirement is met, but the operator action has not yet been executed. The distinguishable change in the signal after a time limit stored in the computing device has expired makes it possible to remind the user of the motor vehicle that the at least one operator action is still required to start the execution of the driving maneuver. In particular, the activation of a locking system used as an activation trigger for the driverless driving maneuver makes it possible to prevent the user from moving away from an unlocked vehicle.

A distinguishable change in the signal can occur, for example, by increasing the flashing frequency of at least one vehicle light when the time limit is exceeded. It is also possible for a plurality of time limits to be stored, with the signal assigned to the current state being changed continuously in a distinguishable manner when the respective successive time limits are exceeded. For example, this can be done by continuously increasing the flashing frequency when the respective, successive time limits are exceeded, such that, as the amount of time in which the operator action is still outstanding increases, the user can be informed by different escalation levels of a flashing frequency that the operator action has not yet been executed.

In addition to a change and/or escalation of the flashing frequency, other signal properties such as a color, brightness or the like of a visual signal, or a pitch or a sound of an acoustic signal or an acoustic signal component, can of course also be changed. It is also possible to add an acoustic signal component to a signal that was previously only displayed visually, such that the urgency of executing the operator action of the user can advantageously be identified.

According to the present disclosure, it can be provided that, as a admissibility requirement, a motor vehicle-internal admissibility requirement and/or a motor vehicle-external admissibility requirement is checked, in particular by communication with an infrastructure. A motor vehicle-internal admissibility requirement can be, for example, the operational readiness of a sensor device used to execute the driverless driving maneuver, for example an environment sensor system of the motor vehicle used to execute the driving maneuver. It is also possible that an admissibility requirement provides that all motor vehicle doors and motor vehicle hatches must be closed in order for it to be met. An admissibility requirement can also provide that in order for it to be met, for example, a destination of the driving maneuver that can be executed without a driver must have been selected by the user.

As a motor vehicle-external admissibility requirement, communication with an infrastructure can be used, for example, to check whether there is a free parking space in the vicinity of the motor vehicle in which the motor vehicle can park when executing the driverless driving maneuver. It is possible for each checked admissibility requirement to be assigned its own state, which can be recognized by the user through a distinguishable signal. It is also possible for a common state to be assigned to a plurality of different admissibility requirements. This makes it possible, for example, to indicate to the user that an admissibility requirement from a group of admissibility requirements that are combined for the given state is not met. This can be the case, for example, for admissibility requirements that are not met in the event of a technical defect in the motor vehicle, for example a defect in one of a plurality of sensor devices used to execute the driving maneuver.

According to the present disclosure, it can be provided that if the at least one admissibility requirement is not met, information relating to the admissibility requirement is displayed on a display device of the motor vehicle and/or is transmitted to a device connected to the communication device of the motor vehicle via a communication link. In particular, this device can be the same device on which the at least one operator action is to be executed. The information relating to the admissibility requirement not being met can in particular contain an instruction as to how the admissibility requirement can be met.

For example, in the case of an admissibility requirement that requires all vehicle doors or vehicle hatches to be closed in order to be met, the user can be informed, if this admissibility requirement is not met, that a vehicle door or vehicle hatch, in particular which vehicle door or vehicle hatch, must still be closed by the user to meet the admissibility requirement. It is also possible, for example, for the user to be informed that a destination of the driving maneuver that can be executed without a driver has not been selected, such that the driver can make the destination selection in order to meet this admissibility requirement.

The information can be transmitted to a device connected to the motor vehicle, in particular a smartphone, such that the user of the motor vehicle can recognize the information from outside the motor vehicle. In addition or as an alternative, it is possible for the information in question to also be displayed on a display device of the motor vehicle, for example on an operating device in the interior of the motor vehicle.

In a preferred embodiment of the present disclosure, it can be provided that the driving maneuver is an automated parking process or includes an automated parking process. In addition to executing a parking process, i.e., moving the motor vehicle to a free parking space and/or into a free parking spot, the automated parking process can also include other driving processes, for example driving the motor vehicle to a free parking space or a free parking spot.

It is provided for a motor vehicle according to the present disclosure that it comprises a computing device, the computing device being configured to execute a method according to the present disclosure.

All the advantages and configurations described above in relation to the method according to the present disclosure apply correspondingly to the motor vehicle according to the present disclosure.

In FIG. 1, a motor vehicle 1 according to the present disclosure is shown. The motor vehicle 1 comprises a computing device 2 which is configured to execute at least one driving maneuver that can be executed without a driver. The driving maneuver can in particular be an automated parking process or include an automated parking process.

The computing device 2 is connected to a monitoring device 3, and the monitoring device 3 is configured to detect the execution of an operator action by a user of the motor vehicle to start the execution of the driving maneuver. Furthermore, the computing device 2 is connected to a communication device 4 of the motor vehicle. The communication device 4 can communicate with a vehicle-external mobile device 6 via a communication link 5. The computing device 2 is also connected to a signaling device 8, which in the present embodiment comprises a plurality of vehicle lights. The headlights 9 and a plurality of signal lights 10, 11 are used as vehicle lights. The signal lights 10 can be configured, for example, as brake lights, and the signal lights 11 can be configured as turn signal lights. In addition or as an alternative to this, other headlights or other signal lights, for example a daytime running light of the motor vehicle 1, can also be used. Furthermore, the computing device 2 is connected to a signaling device 12 configured for acoustic signaling.

The computing device 2 is configured to check whether at least one admissibility requirement for the execution of the driving maneuver that can be executed without a driver is met before the driving maneuver is executed. Furthermore, before the driving maneuver is executed, it can be detected whether or not at least one operator action required to start the driving maneuver has been executed by a user of the motor vehicle 1 located outside the motor vehicle 1. The execution of the operator action is detected by the monitoring device 3 connected to the computing device 2 and/or based on a transmission of information describing the execution of the operator action to the communication device 4 of the motor vehicle connected to the computing device 2, wherein the monitoring device 3 or the communication device 4 transmit the execution of the operator action to the computing device 2. Failure to execute the operator action can be determined accordingly by the failure to transmit information to the communication device 4 or by the failure of the monitoring device 3 to detect that the operator action has been executed, or the failure of a corresponding transmission to the processing unit 2.

The operator action can be executed, for example, on the motor vehicle itself or on the mobile device 6 connected to the communication device 4 via the communication link 5. The mobile device 6 can be a smartphone, for example, which includes an app on which an operator action to start the execution of the driving maneuver can take place. It is also possible for the mobile device 6 to be a vehicle key in which, for example, an activation command for a vehicle locking system of the motor vehicle 1 can be given, which is transmitted to the motor vehicle 1 and received there by the communication device 4, and is transmitted to the computing device 2, such that the execution of the operator action, i.e., the activation of the vehicle lock, can be detected by the computing device 2. It is also possible for the operator action to be the user moving away from the surroundings of the motor vehicle, wherein the movement is detected by the monitoring device 3, which is or comprises, for example, monitoring the surroundings of the motor vehicle 1.

Furthermore, the computing device 2 of the motor vehicle 1 is configured to check that at least one admissibility requirement for the execution of the driving maneuver is met. For this purpose, the computing device 2 can be connected, for example, to other control devices and/or sensor devices of the motor vehicle 1 in order to check one or more vehicle-internal admissibility requirements. The admissibility requirements can include, for example, the operational readiness of a sensor device (not shown) of the motor vehicle 1 used to execute the driving maneuver, and/or can provide that all motor vehicle doors and/or motor vehicle hatches of the motor vehicle 1 are closed.

The communication device 4 allows the motor vehicle 1 to also communicate with a vehicle-external communication device, for example the communication device of an infrastructure, such that the computing device 2 can also check vehicle-external admissibility requirements, for example the presence of a free parking space to execute a parking maneuver.

According to whether the at least one admissibility requirement is met, and according to whether or not the at least one operator action is executed, the computing device 2 determines a state from a group of possible states. The state is determined in particular according to whether the or all of the admissibility requirements are met, and/or which admissibility requirements are met or not met, and/or whether the operator action to start the execution of the driving maneuver was executed or whether the operator action is still pending.

Depending on the state determined by the computing device 2, the signaling device 8 configured to generate a visual signal and/or the signaling device 12 configured to generate an acoustic signal is used by the computing device to generate a signal assigned to the determined state from a group of distinguishable signals that are perceptible outside the motor vehicle, and that are each assigned to one of the possible states.

For this purpose, for example, the headlights 9 and/or the signal lights 10, 11 can be actuated to generate different and distinguishable signals, wherein the signals can be distinguished by a different color and/or a different flashing frequency and/or a different operating pattern of the headlights and/or the signal lights. In addition or as an alternative to this, it is also possible, at least for some of the signals, for the signaling device 12 to be actuated in order to generate a signal assigned to the state. The acoustic signals can differ in each case by a different pitch, a different sound and/or a different time sequence of tones and/or sounds. One or more signals assigned to one of the possible states can also include a visual signal component and an acoustic signal component.

FIG. 2 shows a block diagram of a first embodiment of a method according to the present disclosure. The block diagram comprises the steps S1 through S4. Step S1 can check that at least one admissibility requirement is met for the execution of the driving maneuver. Step S2 can detect the execution, or the absence thereof up to the present time, of at least one operator action required to start the execution of the driving maneuver by a user of the motor vehicle 1 who is outside of the motor vehicle 1. Steps S3 and S4 can determine a state from a group of possible states, and actuate at least one signaling device 8, 12 to generate a signal assigned to the determined state from a group of distinguishable signals respectively.

In the method, for example, each of the states described below is determined and is made known to a user located outside of the motor vehicle 1 via a different signal.

A first state exists when all the admissibility requirements are met and an operator action to start the implementation of the driverless driving maneuver is still pending. For this purpose, for example, the signaling device 8 can be actuated in such a way that a fundamental readiness of the motor vehicle 1 to drive is signaled. This can be identified, for example, by a pulsing of the vehicle lights, for example the headlights 10 and/or the signal lights 11, or a color of the light emitted by the vehicle lights that is assigned to the determined state. It is also possible for one or more of the vehicle lights to remain on permanently—for example, the signal lights 11 configured as turn signal lights. A user positioned outside of the motor vehicle 1 can recognize from the signal assigned to the state that the motor vehicle 1 is able to execute the driverless vehicle maneuver if the user triggers the start of the execution of the driving maneuver by executing the at least one operator action, because the vehicle-internal and/or vehicle-external admissibility requirements are met.

If the operator action for starting the driverless driving maneuver is still pending, and a time limit stored in the computing device 2 has already been exceeded, attention can be drawn to the urgency of executing the operator action. For this purpose, for example, a property of the signal can be changed in a distinguishable manner after the time limit has been exceeded. For example, this can be done by pulsing or flashing one or more vehicle lights at a faster frequency. It is also possible that, in addition to a visual signaling via the signaling device 8, the signal is supplemented by an acoustic signaling by the signaling device 12. This makes it possible to draw the user's attention to the fact that the operator action required to execute the driving maneuver is still pending.

In this case, it is possible for a plurality of time limits, offset in time, to be used, at which the signal is changed in a distinguishable manner in order to indicate the increasing urgency of executing the operator action for starting the driverless driving maneuver. For this purpose, for example, a flashing frequency or the frequency of a pulsing of at least one of the vehicle lights can be further increased in each case when a further time limit is exceeded.

In this embodiment, the operator action is the activation of a vehicle locking system of the motor vehicle 1 on a vehicle key or on a mobile device 6 configured as a smartphone. It is also possible to activate the vehicle locking system by the user moving away from the surroundings of the motor vehicle. The motor vehicle 1 can be locked using the vehicle key, for example, directly on the motor vehicle 1 by inserting the vehicle key into a lock cylinder of the motor vehicle 1.

In addition or as an alternative to this, the motor vehicle key can be connected to the motor vehicle as a mobile device 6 via the communication link 5, such that the vehicle locking system can be activated using a button on the vehicle key. It is also possible to activate a vehicle locking system by the user moving away from the surroundings of the motor vehicle 1, it being possible to detect the user moving away from the surroundings of the motor vehicle 1, for example, by the monitoring device 3 of the motor vehicle 1.

A second state exists when at least one admissibility requirement is determined to be unmet by the computing device 2. This can be signaled, for example, in that the signal lights 11 of the motor vehicle 1, which are configured as turn signals, are actuated to generate warning flashes. This has the advantage that the user knows that the motor vehicle 1 is not ready to execute the driving maneuver and will not execute the driving maneuver regardless of whether the user executes the operator action.

In particular, it is possible for information assigned to the unmet admissibility requirement to be sent to the mobile device 6 configured, for example, as a smartphone, such that the user outside the motor vehicle 1 can be informed about a possibility of meeting the admissibility requirement. This can be the case, for example, if the admissibility requirement can be met by closing a motor vehicle door or a motor vehicle hatch and/or if a destination for the driving maneuver has to be entered in order to meet the admissibility requirement. In addition or as an alternative to transmission to a mobile device 6 of the user, the information can also be displayed on a display device of the motor vehicle, for example an operating device inside the motor vehicle 1.

It is possible that, in the case of a plurality of admissibility requirements, one or more unmet admissibility requirements are combined in one state, or that different unmet admissibility requirements are each assigned a separate state, such that they can also be distinguished by the user of the motor vehicle 1 based on the different, distinguishable signals generated by the signaling device 8 and/or 12.

A third state, which can be made known to the user outside the motor vehicle 1, relates to the case in which the at least one admissibility requirement or all of the admissibility requirements which are checked by the computing device 2 are met, and the operator action required for starting the execution of the driving maneuver has been executed by the user. Therefore, the activation trigger for executing the driverless driving maneuver has successfully been given.

For this purpose, for example, the vehicle lights can be actuated in an actuation pattern assigned to this state, for example by flashing the turn signal lights 11 in a specific color and/or frequency, such that the user can recognize from this example of a confirmation flashing that the prerequisites required to execute the driving maneuver have all been met, and that the operator action required to start the execution of the driving maneuver has also been executed successfully—i.e., the corresponding operator action has been detected by the monitoring device 3 and/or the information describing the execution of the operator action has been transmitted to the communication device 4 of the motor vehicle 1.

It is possible that the motor vehicle 1 does not start the driving process immediately after the operator action has been executed, but rather that the start of the driving maneuver is delayed due to a traffic situation or the like detected by the motor vehicle 1.

The invention claimed is:

1. A method for executing a driving maneuver by a motor vehicle without a driver, wherein, before the driving maneuver is executed by a computing device of the motor vehicle, the method comprises:
   checking to determine that a motor vehicle-internal admissibility requirement and a motor vehicle-external admissibility requirement via communication with an infrastructure for an execution of the driving maneuver are met;
   detecting an execution of an operator action either by a monitoring device connected to the computing device, and/or based on a transmission of data describing the execution of the operator action to a communication device of the motor vehicle connected to the computing device, wherein the execution of the operator action is required to start the execution of the driving maneuver, the execution of the operator action being performed by a user of the motor vehicle located outside the motor vehicle;
   determining, by the computing device, a state of the motor vehicle from a group of possible states, depending on whether the motor vehicle-internal admissibility requirement and the motor vehicle-external admissibility requirement are met and depending on whether or not the operator action is executed; and
   actuating a signaling device of the motor vehicle to generate a signal assigned to the determined state that can be perceived outside the motor vehicle, wherein each signal from a group of distinguishable signals is assigned to one of the group of possible states.

2. The method of claim 1, further comprising using a vehicle light as the signaling device, wherein the vehicle light is at least one of a headlight, a signal light, a turn signal light, a daytime running light or a brake light.

3. The method of claim 2, further comprising assigning a signal from the group of distinguishable signals to the determined state of the motor vehicle, wherein each signal from the group of distinguishable signals comprises at least one of a different color, a different flashing frequency or a different operating pattern of the vehicle light.

4. The method of claim 1, further comprising using the signaling device configured for acoustic signaling, wherein each signal from the group of distinguishable signals comprises at least one of a different pitch, a different sound, or a different time sequence of tones or sounds.

5. The method of claim 1, wherein the operator action is executed on at least one of the motor vehicle, in a surrounding of the motor vehicle, or on a device connected to the communication device of the motor vehicle via a communication link.

6. The method of claim 5, further comprising activating a vehicle locking system on a vehicle key or a mobile device, when the user moves away from the surrounding of the motor vehicle.

7. The method of claim 1, further comprising changing the signal assigned to the determined state in a distinguishable manner if the operator action does not take place by a time limit stored in the computing device.

8. The method of claim 1, further comprising displaying information relating to the admissibility requirement on a display device of the motor vehicle and/or transmitting to a device connected to the communication device of the motor vehicle via a communication link, if the admissibility requirement is not met.

9. The method of claim 1, wherein the driving maneuver is an automated parking maneuver or includes the automated parking maneuver.

10. A motor vehicle configured to execute a driving maneuver without a driver, the motor vehicle comprising a computing device configured to:
   check to determine that a motor vehicle-internal admissibility requirement and a motor vehicle-external admissibility requirement via communication with an infrastructure for an execution of the driving maneuver are met;
   detect an execution of an operator action either by a monitoring device connected to the computing device, and/or based on a transmission of data describing the execution of the operator action to a communication device of the motor vehicle connected to the computing device, wherein the execution of the operator action is required to start the execution of the driving maneuver, the execution of the operator action being performed by a user of the motor vehicle located outside the motor vehicle;
   determine, by the computing device, a state of the motor vehicle from a group of possible states, depending on whether the motor vehicle-internal admissibility requirement and the motor vehicle-external admissibility requirement are met and depending on whether or not the operator action is executed; and
   actuate a signaling device of the motor vehicle to generate a signal assigned to the determined state that can be perceived outside the motor vehicle, wherein each signal from a group of distinguishable signals is assigned to one of the group of possible states.

11. The method of claim 1, further comprising:
   determining a first state of the motor vehicle from the group of possible states, wherein in the first state at least one admissibility requirement for the execution of the driving maneuver is not met and the operator action has not been executed; and
   generating for the signaling device, a first signal corresponding to the first state.

12. The method of claim 1, further comprising:
   determining a second state of the motor vehicle from the group of possible states, wherein in the second state at least one admissibility requirement for the execution of the driving maneuver is met and the operator action has not been executed; and
   generating for the signaling device, a second signal corresponding to the second state.

13. The method of claim 1, further comprising:
   determining a third state of the motor vehicle from the group of possible states, wherein in the third state at least one admissibility requirement for the execution of the driving maneuver is met and the operator action has been executed; and
   generating for the signaling device, a third signal corresponding to the third state.

14. The method of claim 1, further comprising:
   determining that the operation action for starting the driving maneuver is pending;
   determining if a time limit within which the operation action for starting the driving maneuver should have been received has exceeded; and
   changing a property of the signal after the time limit has exceeded.

15. The method of claim 1, further comprising:
changing a property of the signal after a time limit of a plurality of time limits offset in time have been exceeded.

* * * * *